United States Patent [19]

Chambe

[11] 4,230,451
[45] Oct. 28, 1980

[54] APPARATUS FOR THE THERMAL TREATMENT OF ORGANIC MATERIALS

[76] Inventor: Maurice Chambe, Saint Irénée, Bessenay, Rhone, France

[21] Appl. No.: 12,492

[22] Filed: Feb. 15, 1979

[30] Foreign Application Priority Data

Feb. 17, 1978 [FR] France .................................. 78 05465

[51] Int. Cl.³ .............................................. F23J 5/00
[52] U.S. Cl. .................................... 432/72; 110/242; 110/255; 432/151
[58] Field of Search ................... 432/13, 72, 151, 222; 110/242, 245, 255; 366/149

[56] References Cited

U.S. PATENT DOCUMENTS

| 44,906 | 11/1864 | Wilson | 432/72 |
| 1,061,941 | 5/1913 | Hoffmann | 432/72 |

Primary Examiner—John J. Camby
Attorney, Agent, or Firm—Karl F. Ross

[57] ABSTRACT

A method of and an apparatus for the thermal treatment of organic materials, especially organic wastes, makes use of a horizontally elongated tank in which the waste is agitated in contact with a thermally conductive wall externally heated by the circulation of a hot gas thereover. The hot gas is generated by injecting, into the space between this wall and an insulated wall, a combustion gas from a burner into which vapors released from the organic material are fed so that the vapors are fully burned within the burner.

5 Claims, 3 Drawing Figures

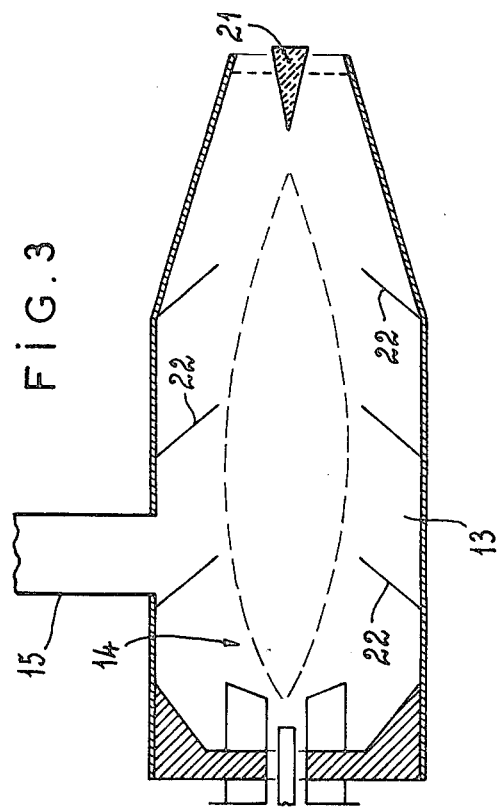
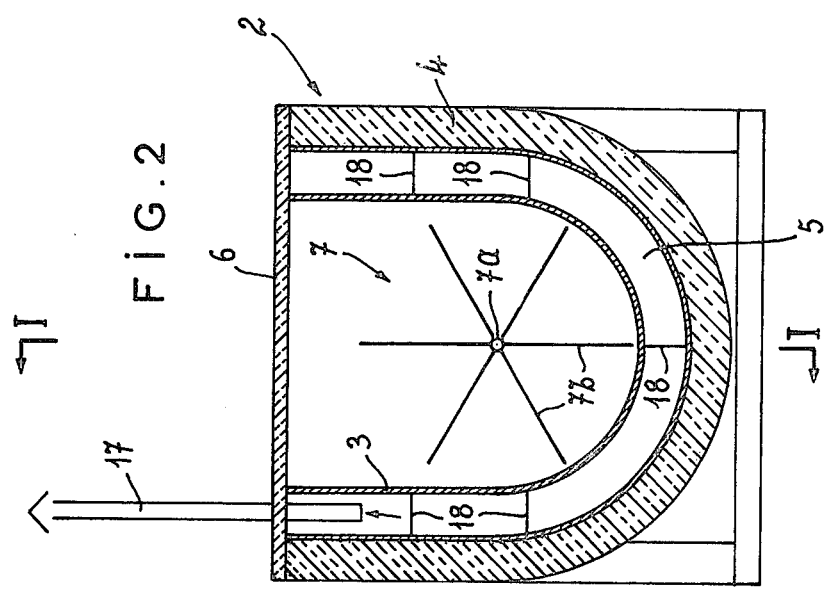

APPARATUS FOR THE THERMAL TREATMENT OF ORGANIC MATERIALS

FIELD OF THE INVENTION

The present invention relates to an apparatus for the thermal treatment of organic materials and, more particularly, for the roasting, dehydration and sterilization of organic substances of all kinds, especially organic wastes such as excrement and sewage treatment sludges in a partly dewatered form or completely dewatered form, manures, slaughterhouse wastes, incubator wastes, hide and carcass wastes, refinery wastes and like organic materials which release combustible or thermally degradable vapors upon heating. The apparatus is also usable to form a sterile product which can be employed for soil enrichment or for animal feeds, and for the dehydration of vegetables and vegetable matter.

BACKGROUND OF THE INVENTION

Numerous processes and systems have been provided for the thermal treatment of organic substances and, especially, for the thermal conversion of organic wastes into useful products by a process involving dehydration, roasting or baking and sterilization.

For example, sludges obtained from municipal sewage treatment are commonly dewatered and subjected to some type of sterilization treatment involving heating if the organic matter is to be used subsequently, e.g. in soil enrichment. The organic material may thus be roasted and a variety of plants have been provided for this purpose.

Similar systems are used for the thermal treatments of other organic wastes and materials.

One of the disadvantages of conventional systems is the evolution of vapors and gases which carry with them odorific components and frequently even toxic substances which should not be discharged into the atmosphere. The conventional systems also have the disadvantage that they are generally complex, require much manpower and are thermally uneconomical.

OBJECTS OF THE INVENTION

It is the principal object of the present invention to provide an improved system thermally treating organic wastes whereby the disadvantages of earlier systems can be avoided.

Another object of the invention is to provide an improved apparatus for the thermal treatment of organic materials.

Yet another object of the invention is to provide an apparatus for thermally treating organic substances, especially organic wastes, which effects total destruction of any odors, reduces the manpower requirement and is more economical than earlier systems from an energy viewpoint.

SUMMARY OF THE INVENTION

These objects and others which will become apparent hereinafter are attained, in accordance with the present invention, in a process for the thermal treatment of organic materials, especially organic wastes, which can involve the dehydration, sterilization and roasting or baking of the organic materials to yield useful solids, the process encompassing agitating the mass of the organic wastes in a sealed chamber in contact with a thermally conducting wall which is externally heated by combustion gases generated by a burner into which vapors released in the sealed chamber from the organic materials are fed for combustion in the burner flame. By the continuous recycling of all evolved gases and vapors from the solid material to the burner flame, e.g. by mixing, these vapors and gases with the combustion-sustaining gas (air) and the fuel, total destruction of these vapors is effected, the recycled gas and vapors contribute calorific value to the combustion process and therefore improve the fuel economy, and because of the total destruction of the odor-carrying gas or vapor by combustion, the gases, discharged into the environment, are free from odorific, noxious or toxic substances.

The apparatus of the present invention comprises a horizontally elongated double-wall tank formed with a semicylindrical bottom and provided internally with mixing or agitating means for moving the organic material within the sealed chamber delimited by the inner wall against the latter.

According to the invention, the space between the inner and outer wall is supplied with the combustion gases from a burner which can open into the space below the semicylindrical bottom of the chamber or inner wall which is of high thermal conductivity while the outer wall is thermally insulating.

According to an important feature of the invention, the tank is provided with a sealable opening communicating with the chamber for introducing the organic wastes, preferably in the roof of the tank, while a further sealable opening forms a discharge orifice at the bottom thereof and, advantageously, at one axial end.

The apparatus is provided with a duct communicating with the chamber, preferably through the roof, and opening into the burner chamber.

The agitating or mixing means within the chamber may comprise a mixer having a horizontal shaft coinciding with or running parallel to the axis of the tank and rotatable in one sense to simply displace the organic material along the thermally conductive wall while rotation in the opposite sense causes its vanes, which can be appropriately shaped, to act as conveyor members and advance the organic material toward the discharge orifice.

Naturally, sensor means can be provided within the chamber to ensure the development of the desired temperature therein. The thermal sensor, of course, can maintain the temperature at the value desired.

While the burner can be operated to provide a suction which induces recirculation of the evolved vapors and gases it has been found to be advantageous to provide a blower or the like for the force-feeding of the released vapors and gas to the burner.

The configuration of the burner, according to the best mode currently known to me for carrying out the invention in practice, includes a frustoconically converging outlet which, at its mouth, is provided with a heated refractory body of inwardly converging frustoconical configuration which constricts this mouth or orifice. This body, which is heated to incandescence, serves to ensure that no organic substances can traverse the orifice without undergoing combustion or pyrolysis.

The space between the two walls through which the combustion gases pass to heat the contents of the chamber is preferably provided with a network of baffles to ensure effective distribution of the hot gases along the wall and optimum transfer of heat therethrough.

BRIEF DESCRIPTION OF THE DRAWING

The above and other objects, features and advantages of the invention will become more readily apparent from the following description, reference being made to the accompanying drawing in which:

FIG. 2 is a transverse cross-section view through the apparatus of FIG. 1 taken along the line II—II thereof; and FIG. 3 is a cross-sectional view drawn to an enlarged scale showing a detail of the burner of the apparatus of FIG. 1.

SPECIFIC DESCRIPTION

Figure 1:
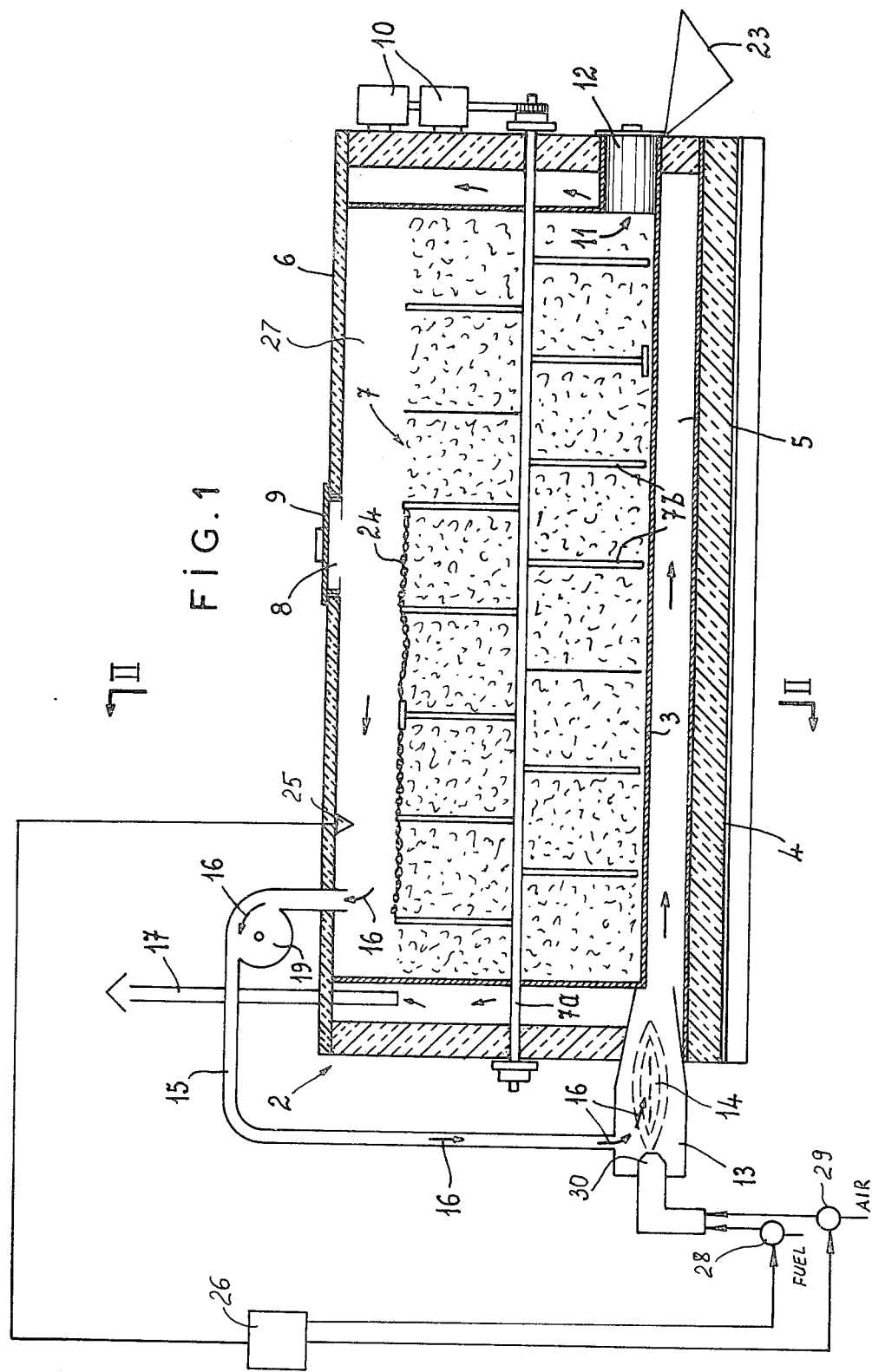
FIG. 1 is a longitudinal vertical cross-sectional view through an apparatus for the heating of organic matter in accordance with the present invention, the view being taken substantially along the line I—I of FIG. 2.

As can be seen from the drawing, the apparatus of the present invention is constituted as a horizontally elongated structure 2 which is formed with a cylindrical bottom and a pair of vertical longitudinal walls rising from this cylindrical bottom and closed at its axial ends. The trough-shaped tank 2 is also closed at its top by a horizontal wall. Thus the tank has generally a horseshoe cross section taken transversely to the horizontal axis of the tank.

The tank is a double wall structure, i.e. comprises an inner wall of a material which is a good heat conductor, e.g. a metal or metal alloy of copper, steel, stainless steel or aluminum, while the exterior wall 4 is composed of a thermally insulating material, e.g. a refractory, ceramic or the like.

A space 5 is provided between the two walls along the bottom and longitudinal end sides of the tank and constitutes a space or duct for circulating the heated air which is used to dehydrate and eventually roast or bake the organic material received in the tank, i.e. in the space (heating chamber) delimited by the inner wall 3 and the top 6 of the apparatus.

The roof 6 of the tank is a wall which seals this space and is also constituted of a thermally insulating material.

A mixer is provided within the tank 2 and has been shown at 7. This mixer has a shaft 7a which runs parallel to or coincides with the axis of the bottom of the tank and projects at least one end wall at which it is driven by a gear or belt drive via an electric motor and speed-reducing gearing as represented at 10. The other end of the shaft 7a is provided with a journal bearing on the opposite end wall of the tank. The shaft carries a plurality of radial arms 7b which are axially spaced apart along the shaft and which serve to rotate the mass along the wall 3 and mix the mass during the heating operation.

A filling opening 8 is provided in the roof 6 and is closed sealingly by a removable cover 9. A discharge orifice 11 of the tank opens at the bottom of the space receiving the mass and communicates via a discharge duct with a chute 23. The duct can be closed sealingly by a removable plug 12.

A burner 14 is provided and has a combustion chamber 13 which opens through its forwardly converging mouth into the circulating chamber or space 5 below the bottom of the space delimited by the wall 3. The burner is supplied with fuel, which can be natural or synthetic gas, fuel oil, or some other combustion by a suitable nozzle, atomizing sprayer or injector, the fuel burning as represented by broken lines within the chamber 13. The result is a mixture of combustion gases and hot air circulates around the wall 3 to heat the mass therethrough. The hot gases heat, dehydrate and eventually bake the organic material introduced into the tank through opening 8 to generate gas, the material being mixed and moved along the wall 3 by the mixer 7.

The interior of the tank is connected to the combustion chamber 13 of the burner 14 by a duct 15 for delivering the evolved gases to the burner to which fresh air is also supplied with the fuel in the usual manner.

Since a subatmospheric pressure may be generated in the burner chamber slightly upstream of the expanding gases resulting from combustion, e.g. by the venturi effect, this suction may be sufficient to draw the released gases as represented by the arrow 16 through the duct 15 into the burner 14. The vapor released from the organic material is thus fed to the flame of the burner during the mixing of the fuel with the air and is burned to generate at least a substantial portion of the calories required for operating the heating apparatus.

This system, therefore, has the two-fold advantage that the vapors or gases evolved from the organic material and which carry the odor are completely destroyed by combustion and, in addition, the gases are fed to the burner at their vaporization temperatures which permits a significant recuperation of calories so that the fuel consumption of the apparatus is substantially less than if the same was operated with a quantity of fresh air equivalent to that of the recirculated gases.

A chimney 17 is provided at an upper portion of the chamber 5 for discharging the excess of the combustion gases.

A better distribution of the heat along the interior wall 3 of the tank 2 is obtained by providing this wall with baffles 18 at staggered locations. The baffles have only been shown diagrammatically in FIG. 2.

Furthermore, it is possible in accordance with the present invention to improve the circulation of the released vapors by providing in the duct 15, a blower 19 or some other means for displacing gas.

In order to eliminate any risk of noncombustion of the recycled vapors in the combustion chamber 13 of burner 14, a refractory body 21 is disposed at the center of the discharge orifice or mouth of chamber 13 (FIG. 3), i.e. immediately ahead of the combustion flame, this body being maintained continuously at red heat by the flame. In addition, the mouth of the burner is formed as a frustocone converging toward the orifice, thereby forcing all of the gases toward and along the body 21. The contact of this gas with the refractory body heated to glowing, insures combustion or thermal degradation of all organic material within the gas before it enters the space 5.

The frustoconical mouth of the chamber 13 also has been found to promote the mixing of the recycled vapors with the burner flame.

As is also shown in FIG. 3, the combustion chamber 13 of the burner 14 can be provided with forwardly and inwardly inclined deflectors 22 which are effective to prevent any return of the combustion gases along the outer walls of the chamber to the combustion flame and any reverse flow of combustion gases through the passage 15.

According to yet another feature of the invention, each vane or blade 7b of the mixer is formed with a lateral ramp, not visible in the drawing oriented so as to deflect the organic material toward the discharge orifice 11 in one sense of rotation of the mixer. Thus for normal mixing operations, the mixer is driven in the opposite sense and for discharge of the treated product can be briefly rotated in the first-mentioned sense to advance the material to the orifice in the manner of a screw conveyor. The chute or hopper 23 does not receive the product.

The free ends of the mixer vanes may be provided with spaced-apart chains 24 or other flexible elements to limit the adhesion of the organic material to the interior wall 3 of the tank 2.

The apparatus of FIG. 1 is provided with a temperature sensor 25 which feeds into a controller 26 for maintaining the desired temperature in the treatment chamber 27. The controller can operate the fuel valve 28 or the air valve 29 of the burner nozzle 30 for temperature regulation in a manner known per se.

Naturally, the system described can be modified within the scope of the appended claims without deviating from the spirit of the invention, all such modifications being deemed within the inventive concept.

I claim:

1. An apparatus for the thermal treatment of organic material comprising:
    a horizontally elongated tank having a generally cylindrical bottom and formed with an inner wall of thermally conductive material spaced from an outer wall of thermally insulating material whereby the space between said walls forms a gas-flow passage;
    a roof hermetically sealed to said tank and defining with said inner wall a chamber for receiving a mass of organic material, said roof being provided with a sealable opening through which said mass can be introduced into said chamber, said tank being formed along the bottom thereof with a sealable outlet for discharging the thermally treated mass;
    a burner opening into said passage and sustaining flame adapted to generate hot air which traverses said passage along said inner wall to heat said mass;
    a duct for feeding vapor evolved in said chamber to said burner and to supply said flame with said vapor;
    a mixer in said chamber for displacing said mass along said inner wall, said mixer being rotatable about a horizontal axis; and
    temperature-sensing means responsive to the temperature in said chamber for controlling same.

2. An apparatus for the thermal treatment of organic material comprising:
    a horizontally elongated trunk having a generally cylindrical bottom and formed with an inner wall of thermally conductive material spaced from an outer wall of thermally insulating material whereby the space between said walls forms a gas-flow passage;
    a roof hermetically sealed to said tank and defining with said inner wall a chamber for receiving a mass of organic material, said roof being provided with a sealable opening through which said mass can be introduced into said chamber, said tank being formed along the bottom thereof with a sealable outlet for discharging the thermally treated mass;
    a burner opening into said passage and sustaining flame adapted to generate hot air which traverses said passage along said inner wall to heat said mass;
    a duct for feeding vapor evolved in said chamber to said burner and to supply said flame with said vapor; and
    a mixer in said chamber for displacing said mass along said inner wall, said mixer being rotatable about a horizontal axis, said burner being provided with a burner chamber having a frustoconically converging mouth terminating at an orifice opening into said passage, and a refractory element adapted to be heated to incandescence by said flame centered in said orifice.

3. An apparatus for the thermal treatment of organic material comprising:
    a horizontally elongated tank having a generally cylindrical bottom and formed with an inner wall of thermally conductive material spaced from an outer wall of thermally insulating material whereby the space between said walls forms a gas-flow passage;
    a roof hermetically sealed to said tank and defining with said inner wall a chamber for receiving a mass of organic material, said roof being provided with a sealable opening through which said mass can be introduced into said chamber, said tank being formed along the bottom thereof with a sealable outlet for discharging the thermally treated mass;
    a burner opening into said passage and sustaining flame adapted to generate hot air which traverses said passage along said inner wall to heat said mass;
    a duct for feeding vapor evolved in said chamber to said burner and to supply said flame with said vapor; and
    a mixer in said chamber for displacing said mass along said inner wall, said mixer being rotatable about a horizontal axis, said passage being provided with an array of baffles for distributing the hot gas along said inner wall.

4. An apparatus for the thermal treatment of organic material comprising:
    a horizontally elongated tank having a generally cylindrical bottom and formed with an inner wall of thermally conductive material spaced from an outer wall of thermally insulating material whereby the space between said walls forms a gas-flow passage;
    a roof hermetically sealed to said tank and defining with said inner wall a chamber for receiving a mass of organic material, said roof being provided with a sealable opening through which said mass can be introduced into said chamber, said tank being formed along the bottom thereof with a sealable outlet for discharging the thermally treated mass;
    a burner opening into said passage and sustaining flame adapted to generate hot air which traverses said passage along said inner wall to heat said mass;
    a duct for feeding vapor evolved in said chamber to said burner and to supply said flame with said vapor; and
    a mixer in said chamber for displacing said mass along said inner wall, said mixer being rotatable about a horizontal axis and being provided with outwardly extending vanes at least some of which are formed on one side with ramps for displacing said mass toward said orifice upon rotation of said mixer in one sense, but adapted to mix the mass without an axial pressure thereon upon rotation of the mixer in the opposite sense.

5. The apparatus defined in claim 1, claim 2, claim 3 or claim 4, further comprising a blower along said duct for the forced displacement of said vapor to said burner.

* * * * *